Mar. 6, 1923.
F. N. SCHAFER
1,447,605
SPRING SUSPENSION FOR AUTOMOBILES
Filed Jan. 28, 1920
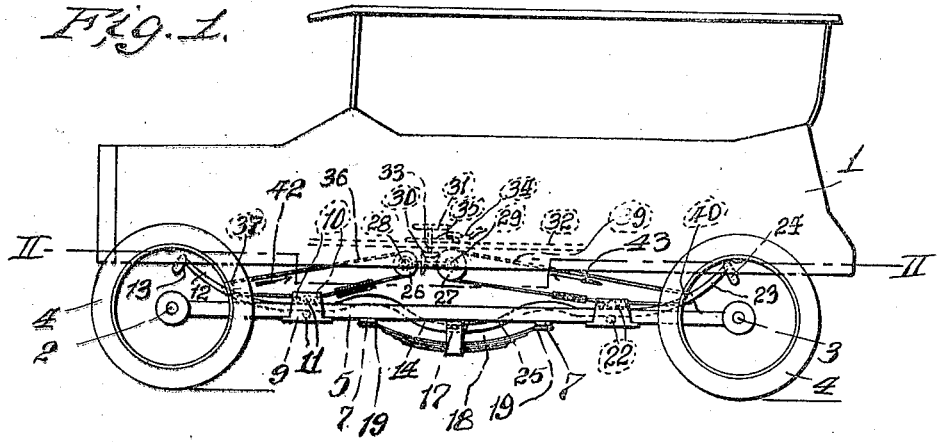
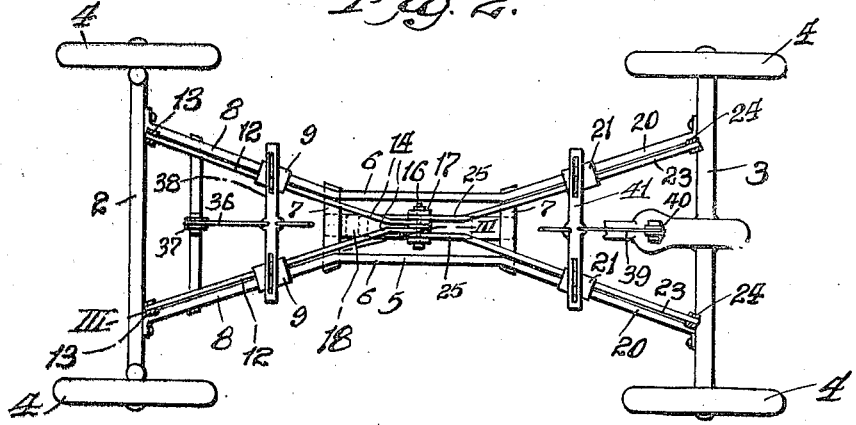
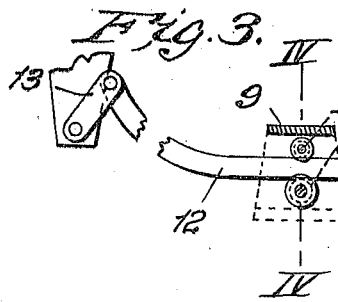
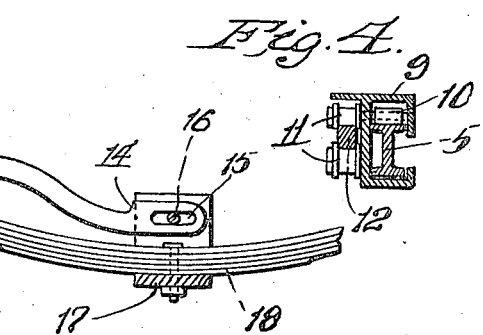
Inventor:
Frank N. Schafer.
By H. G. Fletcher,
atty.

Patented Mar. 6, 1923.

1,447,605

UNITED STATES PATENT OFFICE.

FRANK N. SCHAFER, OF ALTON, ILLINOIS.

SPRING SUSPENSION FOR AUTOMOBILES.

Application filed January 28, 1920. Serial No. 354,742.

*To all whom it may concern:*

Be it known that I, FRANK N. SCHAFER, a citizen of the United States of America, and a resident of Alton, in the county of Madison and State of Illinois, have invented certain new and useful Improvements in a Spring Suspension for Automobiles, of which the following is a specification.

The primary object of this invention is to provide an improved spring suspension for vehicles or the like, whereby the spring or springs of the vehicle and operating parts relating thereto can be adjusted relative to the load of the vehicle.
Another object of the invention is to provide an improved means relative to vehicles with spring suspension, whereby parts operated by the body motion of the vehicle can be regulated relative to applying a greater or lesser movement to the springs of the vehicle.

Other and further objects will appear in the specification and be specifically pointed out in the appended claims, reference being had to the accompanying drawings exemplifying the invention, and in which, Figure 1 is a side elevation of an automobile, showing this improved spring suspension applied thereto.
Figure 2 is a plan view taken approximately on the line II—II of Fig. 1.

Figure 3 is an enlarged fragmentary vertical section taken through one of the body supporting parts of the vehicle, and showing its application to a vehicle spring.

Figure 4 is an enlarged transverse vertical section taken on the line IV—IV of Fig. 3.

Referring by numerals to the accompanying drawings, 1 designates the body of the vehicle, 2 the front axle, 3 the rear axle, and mounted on each of said axles are the wheels 4. Suspended between the axles 2 and 3 is a horizontally extending frame 5, said frame being comprised of a pair of longitudinally extending members 6 which are connected together transversely by the cross members 7.

Slidably mounted on each forwardly extending portion 8 of each of the members 6 is a bracket 9, each of said brackets being supported on the respective portions 8 of each member 6 by a pair of rollers 10, and carried by each of said brackets is a pair of vertically disposed spaced apart rollers 11, and mounted between each pair of rollers 11 of each of said brackets is a body supporting member 12, each member at its upwardly extending end being secured to a shackle 13 which is supported from the body 1 of the vehicle. The opposite end of each of the members 12 is bent downwardly as designated at 14, each being provided with a slot 15, and on account of said members 6 being angularly disposed relative to the front axle 2, the ends 14 thereof approximately meet each other adjacent the longitudinal center of the vehicle body, and passing through each slot 15 of each end 14 is a bolt 16 which is carried by a U-shaped member 17.

The U-shaped member 17 provides a spring seat for an inverted half elliptic spring 18, the extending ends 19 of said spring each respectively bearing against the underside of a cross member 7.

Slidably mounted on each of the incliningly disposed portions 20 of each member 6 is a bracket 21, each of said brackets being roller supported on its portion 20, and carried by each of said brackets is a pair of vertically arranged spaced apart rollers 22, and mounted between said rollers is a body supporting member 23, the upwardly extending end of each of said members 23 being secured to a shackle 24, said shackles being supported from the vehicle body 1, the opposite ends 25 of said members 23 each bearing a slot and through which is engaged the bolt 16 of the U-shaped member 17.

Carried by the vehicle body 1 is a pair of winding drums 26 and 27, each being mounted on respective shafts 28 and 29, said drums adapted to be turned in opposite directions by gearing such as 30, and for operating said gearing is a hand wheel 31 which is mounted above the bottom 32 of the vehicle body 1, said hand wheel being secured to a shaft 33 which passes through the bottom 32 of the body and connects with the gearing 30, and for locking said gearing and drums against turning is a pawl 34 which co-operates with a plate 35 carried by the shaft 33.

Extending from the drum 26 is a cable 36, said cable which is wrapped one or more times around the drum 26, being extended around a grooved pulley 37 which is supported from the frame 5 and is secured to a cross member 38 which ties the brackets 9 to one another, the opposite end of said cable after being passed around the drum 26 also being secured to the cross member 38. A cable 39 is similarly wound around the drum 27 and passed around a grooved pulley 40, the ends of said cable being secured to the cross member 41 which ties the pair of brackets 21 together.

In the operation of an improved spring suspension of this character to a vehicle, the weight of the vehicle body is borne by the upwardly extending ends of the forwardly and rearwardly arranged pairs of body supporting members 12 and 23, the bearing of the body by said members causing the inner extending ends thereof to be forced upwardly on account of the fact that each of said members are fulcrumed between their respective pairs of vertically alined rollers which are borne by the pairs of brackets 9 and 21, and inasmuch as said inner ends of the members 12 are secured to the U-shaped member 17 by the bolt 16, said bracket will be forced upwardly by the undulating movement of the vehicle body, and as said U-shaped member forms a seat for the spring 18, said spring will yieldingly bear the forcing strains applied to said U-shaped member or spring seat.

If a heavier load than usual is to be conveyed by the vehicle, the chauffer thereof will engage the hand wheel 31 and turn it in a direction wherein the cables 36 and 39 will be drawn in the direction indicated by the arrows 42 and 43 respectively, thereby moving the respective pair of brackets 9 and 21 outwardly on the side member 6 of the frame 5, and in which each of the brackets 9 and 21 will be moved along its respective body supporting member or lever 12 or 23 in which the swinging center or fulcrums of the levers 12 and 23 will be changed so that the distance between the vertically alining pair of rollers 11 and the shackles 13 of each lever 12 will be shortened and likewise the distance between the rollers 22 and shackles 24 of each of the levers 23.

This shortening of the leverage of the body engaging ends of the levers 12 and 23 adapts the spring 18 to the increased load carried by the body of the vehicle on account of the fact that said levers at their opposite ends are increased in length and, therefore, will adapt the spring 18 to a greater yielding movement, and while at the same time, the body of the vehicle will be prevented from receiving too much upward movement on account of the upwardly extending ends of the levers being shortened.

From the aforesaid description, it is to be seen that an easier riding vehicle can be provided on account of this improved manner of spring suspension as the movement given to the spring from the body motion can be increased and decreased relative to the load carried by the body, and as it is more likely that a greater amount of added weight to the body will be placed rearwardly thereof, provision is made for shifting the brackets 22 a greater distance than the brackets 9, such provision being made by the drum 26 being made smaller in diameter than the drum 27.

While only one leaf spring 18 is shown in the drawings, for receiving the rocking thrust of the inner ends of the body supporting members 12 and 23, additional springs can be arranged in gang formation, whereby the gang of springs can simultaneously receive the rocking thrust of said members, furthermore; the disposition of the spring or springs and the rocking members can be changed attendant with existing conditions beneath the body of a vehicle, as the main theme of this invention is to shorten or lengthen, or in other words, regulate the distance between the fulcrum of the body supporting members and the ends of said members which bear againt the spring or resilient means.

What I claim is:

1. In a vehicle, a body supporting member pivoted intermediate of its ends, a resilient member to be borne against by said supporting member, and means provided whereby the distance between said pivot and said resilient member can be shortened or lengthened.

2. In a vehicle, the combination of a resilient member and a body supporting member fulcrumed intermediate of its ends having one end bearing against said resilient member, and means provided whereby the distance between the fulcrum of said body supporting member and the ends thereof, which bear against said resilient member can be changed.

3. In a vehicle, the combination of a resilient member and a body supporting member fulcrumed intermediate of its ends having one end bearing against said resilient member, means provided whereby the distance between the fulcrum of said body supporting member and the end thereof, which bears against said resilient member, can be changed, and other means provided for holding the changed position of said fulcrum relative to said body supporting member.

4. In a vehicle, the combination of a body supporting member provided with a shiftable fulcrum which when moved is adapted to shorten or lengthen the distance therebetween and the ends of said member, and a resilient member adapted to be borne against by one end of said body supporting member.

5. In a vehicle, the combination of a body supporting member provided with a shiftable fulcrum which when moved is adapted to shorten or lengthen the distance therebetween and the ends of said member, a resilient member adapted to be borne against by one end of said body supporting member, and there being means provided for shifting said fulcrum.

6. In a vehicle, the combination of a pair of body supporting members fulcrumed intermediate of their ends, resilient means located between said members adapted to be borne against by adjacent ends of said members, and means provided for the shortening or lengthening of the distance between the ends of said members which bear against said resilient means and their respective fulcrums.

7. In a vehicle, the combination of a body therefor and a frame, a series of body supporting members located between said body and said frame each being fulcrumed intermediate of their ends, resilient means adapted to be borne against by one end of each of said members, and means provided for shortening or lengthening the distance between the ends of said members which bear against said resilient means and their respective fulcrums.

FRANK N. SCHAFER.